C. B. MILLS.
FLEXIBLE SHAFT COUPLING.
APPLICATION FILED JULY 5, 1917.
1,266,609.
Patented May 21, 1918.
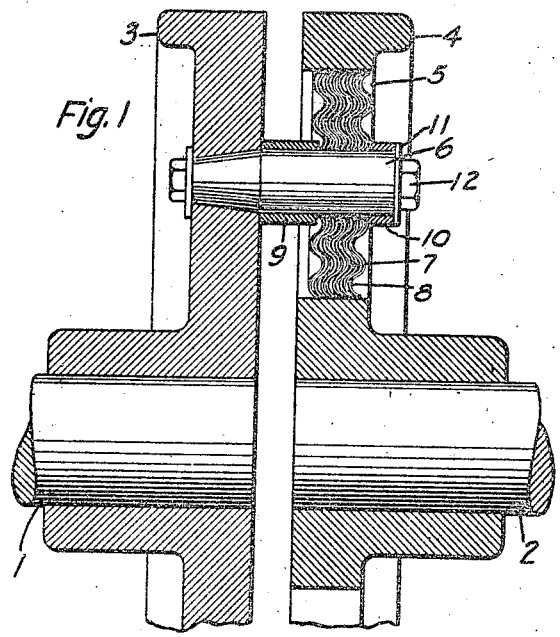
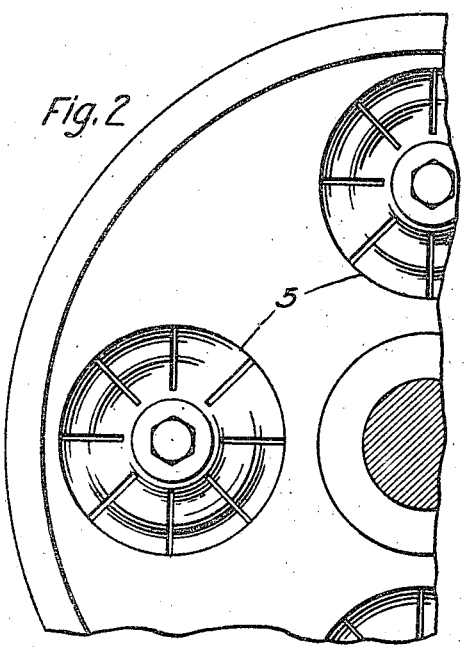
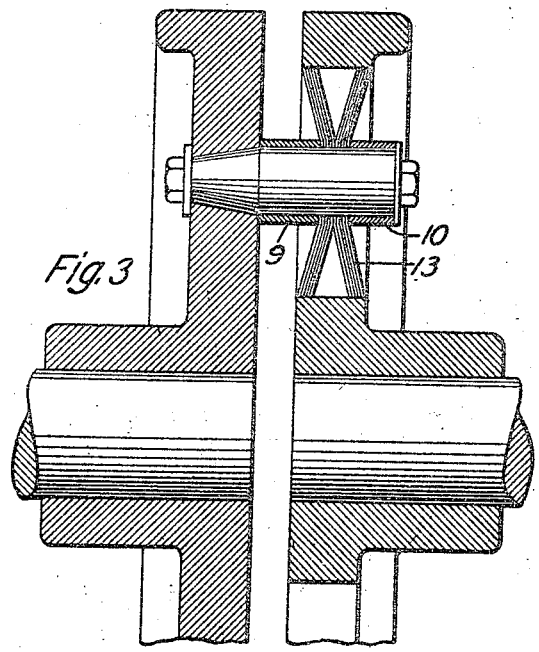
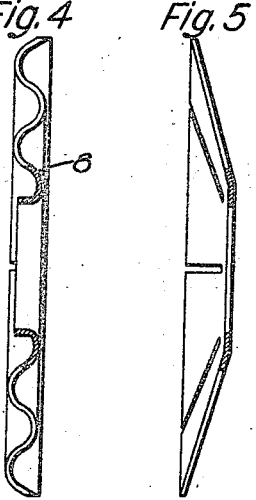
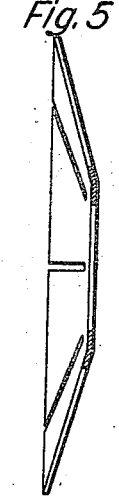
WITNESSES:
Fred. C. Wilharm
O. W. Kennedy
INVENTOR
Chester B. Mills
BY
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC & MANUFACTURING COMPANY, A CORPORATION OF PENNSYLVANIA.

FLEXIBLE SHAFT-COUPLING.

1,266,609.

Specification of Letters Patent.

Patented May 21, 1918.

Application filed July 5, 1917. Serial No. 178,555.

*To all whom it may concern:*

Be it known that I, CHESTER B. MILLS, a citizen of the United States, and a resident of East McKeesport, in the county of Allegheny and State of Pennyslvania, have invented a new and useful Improvement in Flexible Shaft-Couplings, of which the following is a specification.

My invention relates to flexible shaft couplings, and it has for its object to provide a compressible bushing for shaft couplings that may be cheaply and easily manufactured and be highly effective and durable in operation.

Shaft couplings usually comprise compressible bushings composed of rubber or similar material and, while such bushings possess the required degree of compressibility, they require frequent replacement, when employed under operating conditions in which heavy shocks are transmitted through the coupling, as, for example, in rolling-mill service.

By my invention, I provide a flexible coupling comprising compressible metallic bushings that are particularly adapted to withstand heavy shocks, such as are encountered in driving rolling mills or similar apparatus and are capable of adjustment after being applied to the coupling.

In the accompanying drawing, Figure 1 is a sectional view of a portion of a flexible coupling embodying my invention; Fig. 2 is an end view of the parts shown in Fig. 1; Fig. 3 is a sectional view, similar to Fig. 1, showing a modification of my invention, and Figs. 4 and 5 are detail views of portions of my bushing.

Referring to Fig. 1, shaft sections 1 and 2 are rotatably supported in alinement and are provided, at their adjacent ends, with coupling members 3 and 4, respectively. The coupling member 4 is provided with a plurality of spaced circular openings 5 within which are located studs 6 that project from the face of the adjacent coupling member 3 and may be of any desired form. Compressible bushings 7 are located in the openings 5 and are mounted on the studs 6. Each of the bushings 7 comprises a plurality of annular metallic plates 8 that are respectively provided with concentric corrugations, as best shown in Fig. 4. The plates 8 are assembled upon the studs 6 and are positioned thereon and maintained in nesting engagement with each other by sleeves 9 and 10 coacting with a washer 11, and a nut 12 that is in threaded engagement with the stud 6.

A modification of my invention is shown in Figs. 3 and 5 wherein each bushing 7 comprises a plurality of dish-shaped plates 13. The plates 13 are arranged to nest within each other in oppositely disposed groups and are held in position by sleeves 9 and 10, as described with reference to Fig. 1.

From the foregoing, it is apparent that each of the compressible bushings is adapted to effectively absorb shocks that are transmitted through the shaft sections and possesses a degree of durability and strength that may be readily adjusted by varying the number of plates employed in each bushing. Furthermore, the compressibility of each bushing may be regulated by the sleeves on each stud, for it is apparent that the compressibility of the bushings depends upon how closely the plates comprising each bushing nest within each other. An additional advantage of my invention lies in the fact that the bushings are readily applied to the coupling members so that defective bushings or parts thereof may be removed and replaced without separating such members.

While I have shown my invention in several forms, it is obvious that other forms may be employed without departing from the spirit and scope thereof, and I desire that only such limitations shall be imposed thereon as come within the scope of the appended claims.

I claim as my invention:

1. A shaft coupling comprising shaft-carried members, one of which is provided with openings and the other of which is provided with projecting portions located in said openings, and compressible metallic bushings located in said openings and surrounding said projecting portions.

2. A shaft coupling comprising shaft-carried members, one of which is provided with openings and the other of which is provided with projecting portions located in said openings, and compressible bushings respectively comprising inherently resilient metallic plates located in said openings and surrounding said projecting portions.

3. A bushing for flexible couplings comprising a plurality of inherently resilient metallic plates.

4. A bushing for flexible couplings comprising a plurality of annular metallic plates respectively having portions thereof located within the plane of the next adjacent plate.

5. A bushing for flexible couplings comprising a plurality of annular metallic plates respectively having portions thereof displaced and nesting within each other.

In testimony whereof I have hereunto subscribed my name this 29th day of June, 1917.

CHESTER B. MILLS.